United States Patent
Hubbard

(10) Patent No.: US 6,368,249 B1
(45) Date of Patent: Apr. 9, 2002

(54) DRIVER RESPONSIVE POWER-ON DOWNSHIFT CONTROL

(75) Inventor: Gregory A Hubbard, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/629,839

(22) Filed: Jul. 31, 2000

Related U.S. Application Data

(63) Continuation-in-part of application No. 09/574,929, filed on May 19, 2000.

(51) Int. Cl.[7] .............................................. F16H 59/20
(52) U.S. Cl. ...................... 477/121; 477/136; 477/905
(58) Field of Search ............................... 477/DIG. 905, 477/133, 136, 139, 141, 149; 701/55, 56, 58, 60, 61, 67, 68

(56) References Cited

U.S. PATENT DOCUMENTS

| | | | |
|---|---|---|---|
| 4,653,351 A | 3/1987 | Downs et al. ................. | 74/866 |
| 4,796,490 A | 1/1989 | Butts et al. ................... | 74/866 |
| 5,029,494 A | 7/1991 | Lentz et al. ................... | 74/866 |
| 5,070,747 A | 12/1991 | Lentz et al. ................... | 74/866 |
| 5,079,970 A | 1/1992 | Butts et al. ................... | 74/858 |
| 5,468,198 A | * 11/1995 | Holbrook et al. ............ | 477/143 |
| 6,264,580 B1 | * 7/2001 | Tabata et al. ................ | 477/149 |

* cited by examiner

Primary Examiner—Charles A. Marmor
Assistant Examiner—Saúl Rodríguez
(74) Attorney, Agent, or Firm—Leslie C. Hodges

(57) ABSTRACT

An improved power-on downshift control wherein the off-going clutch pressure is controlled to achieve a desired trajectory of the input shaft during the shift, and wherein the desired trajectory is scheduled to optimize shift smoothness under ordinary conditions and shift responsiveness under high driver demand conditions. A driver demand indication such as engine throttle position is monitored, and when its rate of increase exceeds a reference rate, a high rate condition is identified and the current demand indication is stored for future reference. A high demand indication or flag is set or cleared based on the high rate indication and a comparison of the driver demand indication to the stored value. The downshift trajectory is determined in dependence on the high demand indication, and is set to a first calibrated value for achieving a smooth downshift when the high demand indication is cleared, and to a second calibrated value for achieving a quick and firm downshift when the high demand indication is set. Other shift parameters, including the initial off-going release rate and the synchronization hold interval, are also adjusted in dependence on the high demand indication.

8 Claims, 6 Drawing Sheets

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

DRIVER RESPONSIVE POWER-ON DOWNSHIFT CONTROL

RELATED APPLICATIONS

This application is a continuation-in-part of U.S. patent application Ser. No. 09/574,929 filed May 19, 2000.

TECHNICAL FIELD

This invention relates to a shift control for an automatic transmission, and more particularly to a driver responsive control of a power-on downshift.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset. Shifting from a currently established speed ratio to new speed ratio involves, in most cases, disengaging a clutch (off-going clutch) associated with the current speed ratio and engaging a clutch (on-coming clutch) associated with the new speed ratio.

Various techniques have been used for electronically controlling the on-coming and off-going clutches during a power-on downshift. For example, the U.S. Pat. Nos. 5,029,494 and 5,070,747 to Lentz et al. disclose power-on downshift controls in which the off-going clutch is controllably released in an established sequence to allow the engine to accelerate the transmission input shaft to a target speed, whereafter the shift is completed by engaging the on-coming clutch and disengaging the off-going clutch. Similar control techniques are also described in the U.S. Pat. No. 4,653,351 to Downs et al., and the U.S. Pat. Nos. 4,796,490 and 5,079,970 to Butts et al.

In addition to defining the various control sequences of a shift, certain parameters must be selected or calibrated for controlling the rate of shift progression in order to achieve a high quality shift—that is, a shift that feels smooth without creating durability concerns or excessive heating due to clutch slippage. In Lentz et al. U.S. Pat. No. 5,070,747, for example, the off-going clutch pressure is controlled to make the transmission input speed follow an established input speed trajectory or profile. In Downs et al. U.S. Pat. No. 4,653,351, on the other hand, the off-going pressure is progressively released until an established amount off-going clutch slippage occurs, and then maintained at that value until synchronization occurs. While these controls are designed to produce high quality shifting, experience has shown that under certain conditions, such as when passing another vehicle, fast response is more important than shift smoothness. Accordingly, what is needed is a driver responsive shift control that provides high quality shifting under ordinary conditions and highly responsive shifting under high demand conditions.

SUMMARY OF THE INVENTION

The present invention is directed to an improved power-on downshift control wherein the off-going clutch pressure is controlled to achieve a desired trajectory of the input shaft during the shift, and wherein the desired trajectory is scheduled to optimize shift smoothness under ordinary conditions and shift responsiveness under high driver demand conditions. A driver demand indication such as engine throttle position is monitored, and when its rate of increase exceeds a reference rate, a high rate condition is identified and the current demand indication is stored for future reference. A high demand indication or flag is set or cleared based on the high rate indication and a comparison of the driver demand indication to the stored value. The downshift trajectory is determined in dependence on the high demand indication, and is set to a first calibrated value for achieving a smooth downshift when the high demand indication is cleared, and to a second calibrated value for achieving a quick and firm downshift when the high demand indication is set. In a preferred embodiment, other shift parameters including the initial off-going release rate and the synchronization hold interval are also adjusted in dependence on the high demand indication.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
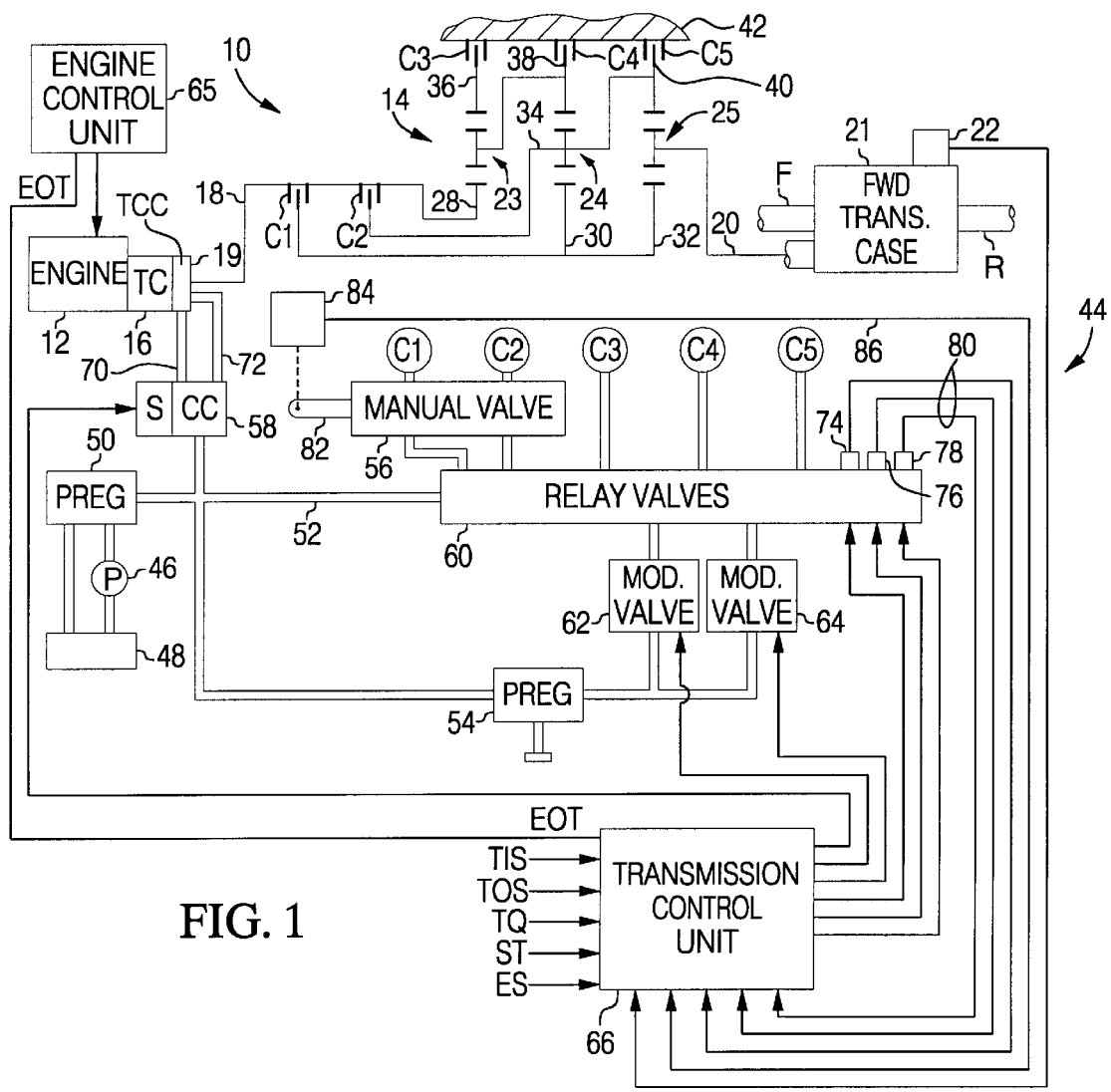
FIG. 1 is a diagram of an automatic transmission and microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one speed forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the engine control unit 65 and the transmission control unit 66, illustrated in FIG. 1 as two separate modules. Both control units 65, 66 are microprocessor-based, and may be conventional in architecture. The engine control unit 65 controls the operation of engine functions such as fuel, spark timing, and so on depending on the control variables afforded by engine 12, and the transmission control unit 66 controls the solenoid operated fluid control valves 58–64 based on a number of inputs to achieve a desired transmission speed ratio. The transmission control unit inputs include signals representing the transmission input speed TIS, a driver demand indication TQ (which may be an engine throttle or throttle pedal position), and the transmission output speed TOS. Sensors for developing such signals may be conventional in nature, and have been omitted for simplicity. Additionally, the engine control unit 65 supplies an engine output torque signal EOT to transmission control unit 66.

The control lever 82 of manual valve 56 is coupled to a sensor and display module 84 that produces an diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for engaging the on-coming clutch while disengaging the off-going clutch, develops corresponding force motor current commands, and then supplies current to the respective force motors in accordance with the current commands.

In a power-on downshift, the transmission speed ratio (TIS/TOS) is increased, which requires that the engine 12 accelerate the transmission input shaft 18 from a pre-shift speed defined by the product (TOS*SRold) to a synchronization speed defined by the product (TOS*SRnew), where SRold is the old or current speed ratio, and SRnew is the new or desired speed ratio. In general, this can be achieved by controllably releasing the off-going clutch pressure while preparing the on-coming clutch for engagement, and then releasing the off-going clutch as the on-coming clutch engages. Indeed, this is the general control premise of the aforementioned U.S. Pat. Nos. 5,029,494, 5,070,747, 4,653, 351, 4,796,490 and 5,079,970.

Figure 3:
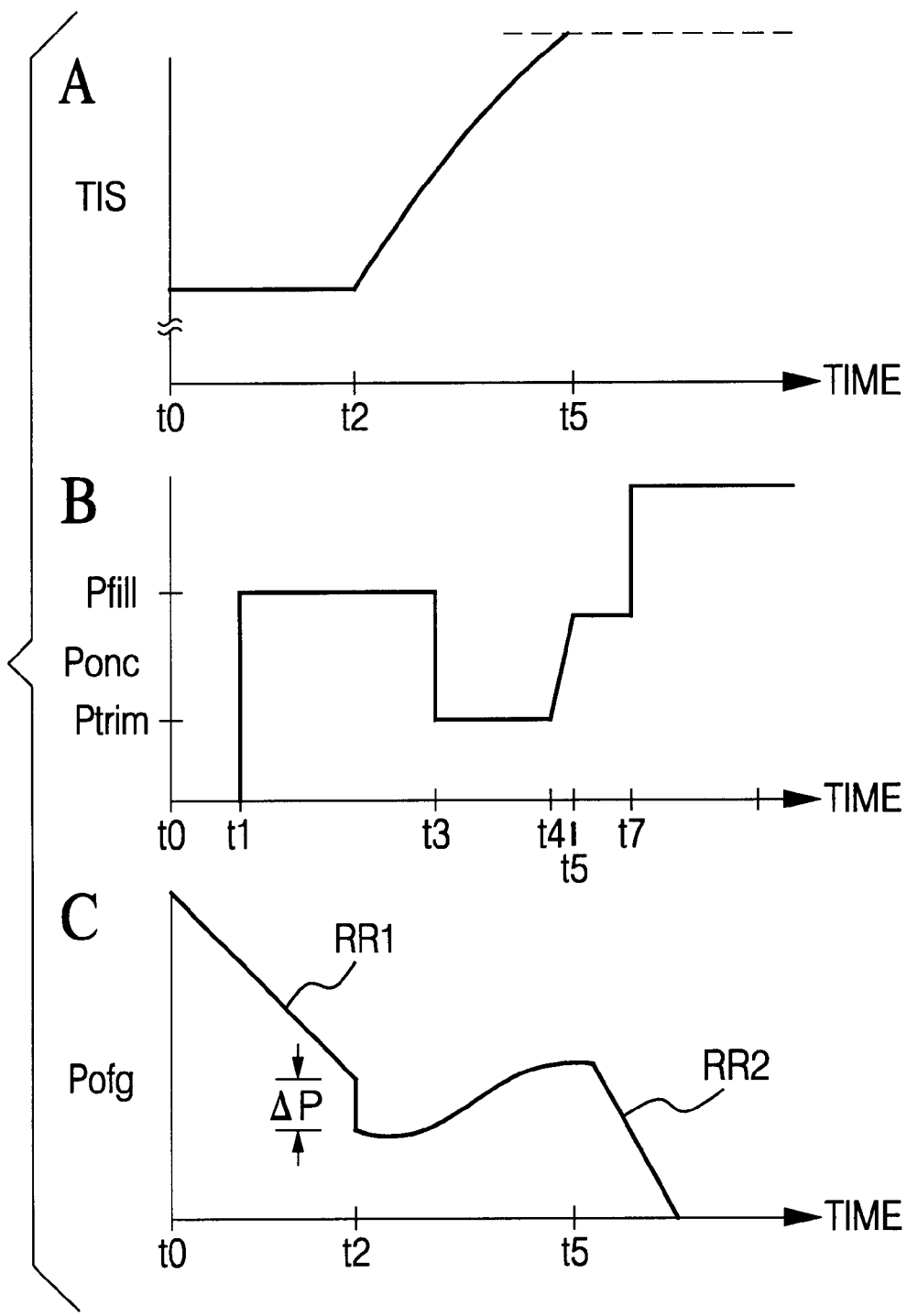
FIG. 3 graphically depicts a power-on downshift carried out by the control unit of FIG. 1; Graph A depicts the transmission input speed, Graph B depicts the on-coming clutch pressure, and Graph C depicts the off-going clutch pressure.

The present control, on the other hand, utilizes a dynamic model of the transmission that takes into account dynamic variations in input torque, and that provides improved and more consistent shift quality with less reliance on extensive adaptive correction. FIG. 3 graphically illustrates a power-on downshift, with Graphs A–C respectively depicting the transmission input speed TIS, the on-coming clutch pressure command Ponc, and the off-going clutch pressure command Pofg. In general, the shift is initiated by progressively reducing Pofg, resulting in off-going clutch slippage at time t2. At such point, Pofg is adjusted to a new level and then controlled to allow the engine to raise the input speed TIS at a desired rate to a synchronization speed (SYNC) defined by the product of the new speed ratio (SRnew) and the output speed TOS. Meanwhile, the Ponc is controlled so that the on-coming clutch will be ready for engagement when TIS nears SYNC at time t4. The time t4 may be defined in terms of a predetermined on-coming clutch slip (that is, SYNC–TIS), but is preferably defined in terms of a predicted time until TIS reaches SYNC, based on measured input acceleration and on-coming clutch slip. In the ensuing interval t4–t7, Ponc and Pofg are controlled to maintain TIS at or near SYNC, and the shift is completed at time t7 by fully engaging the on-coming clutch and fully disengaging the off-going clutch.

On a more detailed level, the off-going pressure control is designed to initiate off-going clutch slip (SLIPofg) a reference time Tofg_slip(des) after shift initiation, which varies depending on whether the shift is a normal or high-demand shift. This is achieved by ramping Pofg downward at a ramp rate RR1 so that its value at the conclusion of the interval Tofg_slip(des)—that is, at time t2—produces a torque capacity corresponding to the minimum reaction torque (TQofg_reaction) required to hold the off-going clutch without slipping. This reaction torque may be computed as a pressure Pofg_reaction according to the expression:

$$Pofg\_reaction = Kcl * Klv * TQin \quad (1)$$

where Kcl is pressure-to-torque gain of the off-going clutch, Klv is the leverage gain corresponding to the old or current speed ratio, and TQin is the transmission input torque. The input torque TQin is subject to variation during the shift, and may be computed based on the engine output torque EOT and the torque ratio TR of torque converter 19. The ramp rate RR1 is set by calibration, and Pofg during the interval t0–t2 is subject to adaptive adjustment based on a detected deviation between the time Tofg_slip(des) and the time when off-going clutch slip actually occurs. Thus, the off-going pressure in the interval t0–t2 is given by the equation:

$$Pofg = Pofg\_reaction + (RR1*t) + Pofg\_adaptive \quad (2)$$

where Pofg_adaptive is the adaptive correction, and t is the accumulated time ramping at the rate RR1.

Once the off-going clutch begins to slip, the off-going pressure is controlled so that the input speed will rise toward the SYNC speed along a desired trajectory defined by a desired acceleration, referred to herein as TIS_DOT(des). For most situations, the desired acceleration has a single value that is calibrated to provide a smooth, high quality, shift feel. However, in certain high demand situations, such as attempted passing maneuvers, quick shift response is more important than shift smoothness, and an elevated acceleration value is substituted for the standard value. As described below in reference to the flow diagram of FIG. 7, a high demand condition is detected by a driver-responsive control that monitors the driver demand indication TQ and the engine output torque EOT.

Regardless of the control mode, the off-going clutch pressure is controlled based on a combination of feed-forward and feedback control. The feed-forward component is based on the dynamic model of the transmission, and the feed-back component is based on a detected input speed error.

The dynamic model of the transmission during this phase of the control comprehends the inertial effects of the engine and transmission, and is given according to the equation:

$$Pofg\_accel = Kcl[(Klv*TQin) + (Kin*TIS\_DOT(des)) + (Keng*ES\_DOT(des))] \quad (3)$$

where Pofg_accel is the off-going pressure required to accelerate the input shaft at the desired acceleration TIS_DOT(des), ES_DOT(des) is the engine acceleration corresponding to TIS_DOT(des), Kin is an inertia coefficient for the input shaft 18, and Keng is an inertia coefficient for the engine 12. The coefficients Kin and Keng are negative in sign, reflecting the fact that an increase in TIS_DOT(des) necessitates a decrease in Pofg_accel.

Although the off-going clutch will theoretically begin slipping at time t2 when Pofg falls to the computed value of Pofg_reaction, slipping may actually begin slightly before or after time t2 due to modeling inaccuracies of equation (1). Regardless of such inaccuracies, it is certain that the off-going clutch reaction torque TQofg_reaction is in equilibrium with the input torque TQin at the instant of off-going clutch slippage. Accordingly, the off-going clutch pressure for input acceleration control is adjusted relative to the modeled off-going pressure when slip is detected. Such pressure is designated as Pofg_at_slip, and is determined as follows:

$$Pofg\_at\_slip = Pofg\_accel(at\ slip) + Pofg\_hyd\_delay \quad (4)$$

where Pofg_accel(at slip) is the value of Pofg_accel (equation 3) when the off-going clutch begins to slip, and Pofg_hyd_delay is a pressure offset due to the hydraulic response delay of the off-going clutch. The hydraulic response delay HD is calibrated for any given clutch, and the term Pofg_hyd_delay is given according to the product (HD*RR1), where RR1 is the off-going pressure ramp ate prior to off-going slip detection. Thus, when off-going clutch slippage is detected, the off-going pressure Pofg is changed by a value ΔP determined according to the equation:

$$\Delta P = Pofg\_reaction - Pofg\_accel(at\ slip) - (HD*RR1) \quad (5)$$

The pressure change may be made in a single step as illustrated in FIG. 3, or may be made in a series of smaller steps if desired. Thereafter, the off-going pressure Pofg is repeatedly computed in the interval t2–t5 according to the equation:

$$Pofg(new) Pofg(old) + Pofg\_accel(new) - Pofg\_accel(at\ slip) + (K*SPD\_ERR) \quad (6)$$

where Pofg(old) is the previous off-going pressure command, Pofg_accel(new) is the evaluation of equation (3) based on the current value of input torque TQin, Pofg_accel(at slip) is the evaluation of equation (3) at the initiation of off-going clutch slippage, K is a closed-loop proportional gain constant, and SPD_ERR is the closed-loop speed error between the TIS and a desired input speed corresponding to TIS_DOT(des).

While the off-going clutch pressure is being controlled to initiate and then control off-going clutch slip, the on-coming clutch is prepared for engagement by setting Ponc to a fill pressure Pfill for a predetermined fill interval (t1–t3), and then lowering Ponc to a trim value sufficient to maintain the on-coming clutch in readiness for engagement. In the preferred embodiment, the combined duration of the fill and trim periods (that is, the interval t1–t4) is designed to be substantially constant for a given shift, regardless of the engine speed or torque. Consequently, the on-coming pressure control is initiated after a variable fill delay Tdelay (defined by the interval t0–t1 in FIG. 3) computed as follows:

$$Tdelay = Tshift - (Tfill + Ttrim) \quad (7)$$

where Tfill is the fill interval t1–t3, Ttrim is the low pressure trim interval t3–t4, and Tshift is the estimated time required to accelerate the input speed to the synchronization speed SYNC, given the desired acceleration TIS_DOT(des). Thus, Tshift may be given by the equation:

$$Tshift = Tofg\_slip(des) + (SYNC - TIS\_init)/TIS\_DOT(des) \quad (8)$$

where TISinit is the input speed TIS at time t2.

The fill pressure Pfill is typically scheduled as a function of fluid temperature Tsump, and the fill time Tfill for any given clutch is determined according to the product of a calibrated fill time Tcal and a factor F representing the percent of fluid exhausted from the clutch since the last shift involving that clutch. Thus, the factor F accounts for any fluid remaining in the clutch, and is given according to the ratio of the time that the clutch has been exhausted to a calibrated time required to fully exhaust the clutch fluid, not to exceed a value of one. Preferably, Pfill is adaptively adjusted by iterative reduction to ensure that TIS will not significantly exceed SYNC; an adaptive adjustment of this type is disclosed in the aforementioned U.S. Pat. No. 5,070, 747, which is incorporated herein by reference. The time Ttrim is calibrated, and the pressure Ptrim may be calibrated or determined through adaptive learning.

When the input speed TIS nears SYNC, the on-coming and off-going clutch pressures are controlled to maintain the input speed at SYNC. The on-coming pressure control is initiated when the estimated time to reach SYNC falls to a predetermined time, represented by the interval t4–t5 in Graph B. As indicated above, the time-to-SYNC may be estimated based on the measured on-coming clutch slip speed (SYNC–TIS) divided by the input shaft acceleration (measured or desired). In the interval t4–t7, the dynamic model of the transmission is used to schedule on-coming pressure based on the input torque TQin and an inertia torque component designed to decelerate TIS in case TIS exceeds SYNC. The model equation for the on-coming synchronization control pressure Ponc_sync is given by:

$$Ponc\_sync = Kcl[(Klv*TQin)+(Kin*TIS\_DOT(sync))+(Keng*ES\_DOT(sync))] \quad (9)$$

where Kcl(Klv*TQin) is the input torque dependent component, and Kcl[(Kin*TIS_DOT(sync))+(Keng*ES_DOT(sync))] is the inertia torque component that is used if TIS exceeds SYNC. The terms TIS_DOT(sync) and ES_DOT(sync) represent desired input and engine pull-down rates for the case where TIS exceeds SYNC.

The off-going clutch pressure when TIS reaches SYNC at time t5 is a combination of a calibrated open-loop ramp and a closed-loop term that increases the pressure as required to hold TIS at SYNC. Specifically, the pressure is repeatedly computed using the equation:

$$Pofg(new)Pofg(sync)-(RR2*Tsync)+(Kp*SLIPonc)+(Ki*\Sigma(SLIPonc)) \quad (10)$$

where Pofg(sync) is the pressure command value at the beginning of the SYNC control period at time t5, RR2 is the open-loop ramp rate, Tsync is the accumulated time in the SYNC control logic (defined as the current time t minus the SYNC initiation time t5), Kp and Ki are proportional and integral closed-loop gain terms, and SLIPonc is the on-coming clutch slip.

In the shift of FIG. 3, the input speed TIS does not exceed SYNC; accordingly, the on-coming pressure in the interval t5–t7 is based solely on input torque, and the off-going pressure is based solely on the calibrated ramp rate RR2. However, if TIS exceeds SYNC, the inertia torque component of equation (9) raises the on-coming pressure to drive TIS back to SYNC at the calibrated rate TIS_DOT(sync), and the closed-loop components (proportional and integral) of equation (10) raise the off-going pressure in relation to SLIPonc to drive TIS back to SYNC. In either case, the shift is completed when TIS is substantially equal to SYNC for a calibrated period of time, which varies depending on whether the shift is a normal or high-demand shift.

Figure 4:
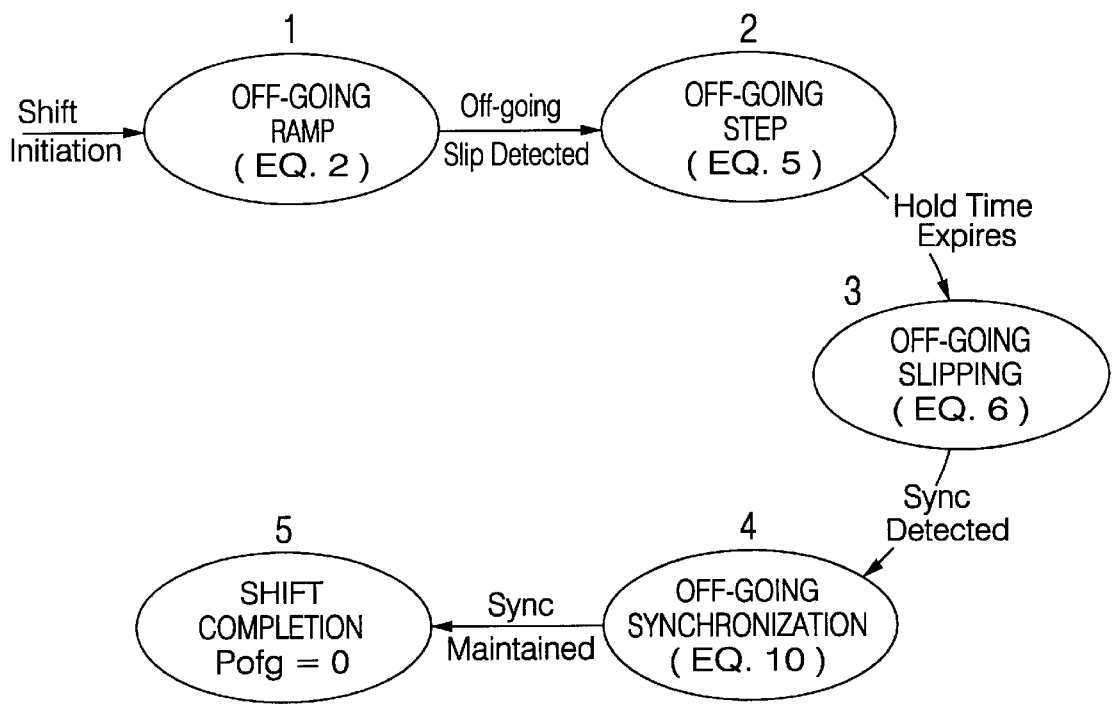
FIG. 4 is a state diagram illustrating an off-going clutch pressure control.
Figure 5:
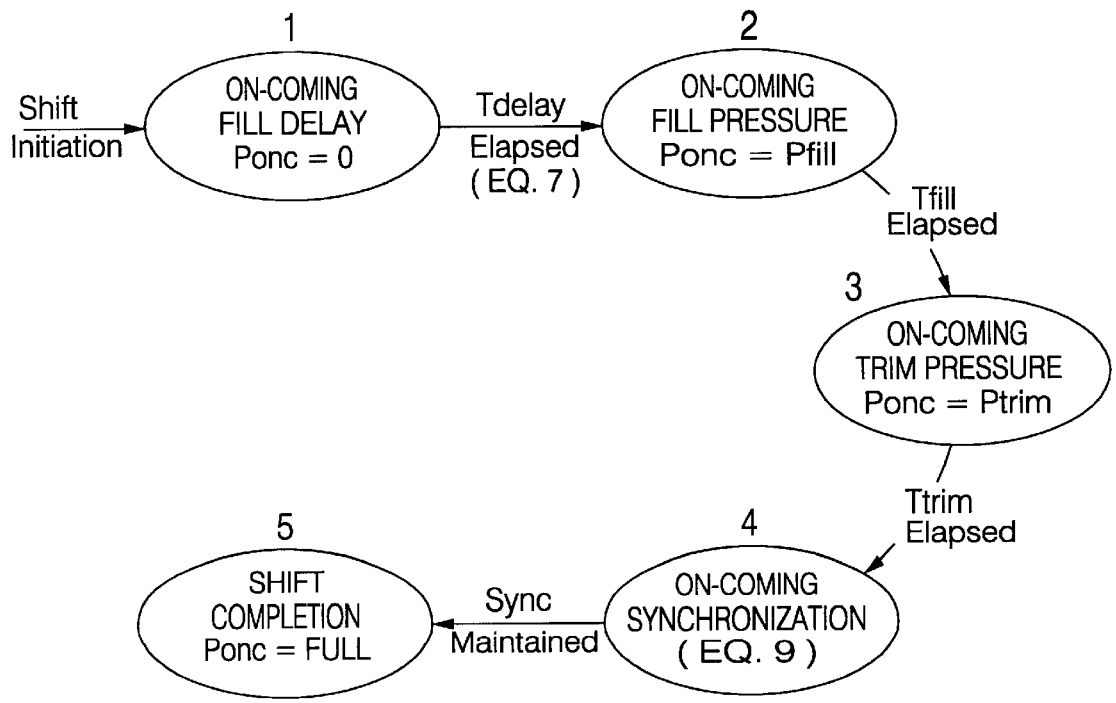
FIG. 5 is a state diagram illustrating an on-coming clutch pressure control.

FIGS. 4 and 5 respectively depict the above-described off-going and on-coming pressure controls as a succession of states or phases. Referring to FIG. 4, the off-going control includes first, second, third, fourth and fifth states. The first state (off-going ramp) is entered at shift initiation, and is characterized by equation (2); the second state (off-going step) is entered on detection of off-going clutch slippage, and is characterized by the ΔP value of equation (5); the third state (off-going slipping) is entered on expiration of a hold period after the ΔP is activated, and is characterized by equation (6); the fourth state (off-going synchronization) is entered when TIS reaches SYNC, and is characterized by equation (10); and the fifth state (shift completion) is entered when TIS is substantially equal to SYNC for a calibrated period Tsync, and involves exhausting the off-going clutch. Referring to FIG. 5, the on-coming control also includes first, second, third, fourth and fifth states. The first state (on-coming fill delay) is entered at shift initiation, and involves a delay characterized by equation (7); the second state (on-coming fill pressure) is entered following the fill delay, and involves filling the on-coming clutch at Pfill for a predetermined period Tfill; the third state (on-coming trim) is entered following the fill period Tfill, and involves holding the pressure at a reduced value for a trim period Ttrim; the fourth state (on-coming synchronization) is entered when the estimated time to synchronization reaches a reference time, and is characterized by equation (9); and the fifth state (shift completion) is entered when TIS is substantially equal to SYNC for a calibrated period Tsync, and involves applying full pressure to the on-coming clutch.

Figure 6:
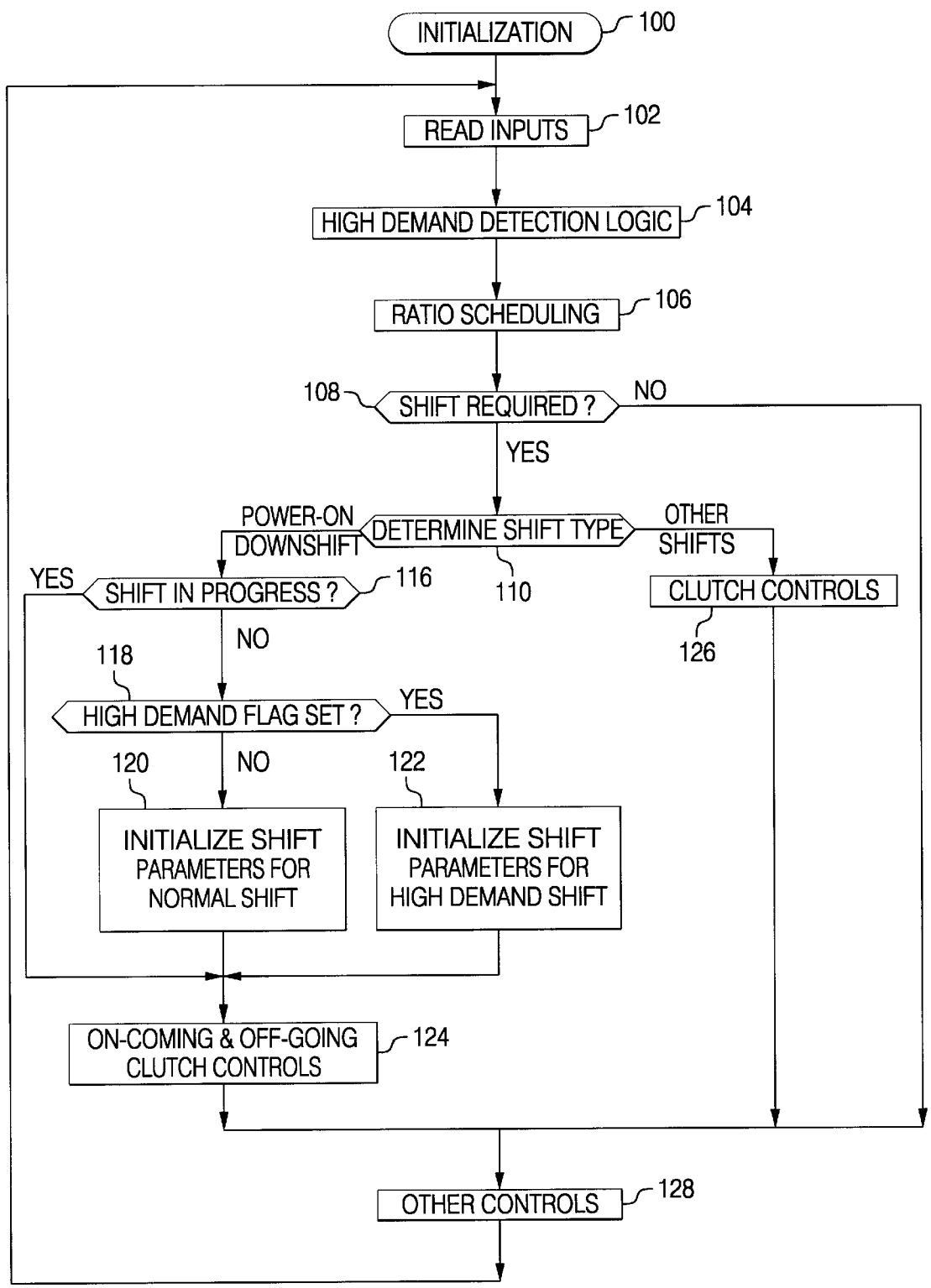
FIG. 6 is a flow diagram representative of computer program instructions executed by the control unit of FIG. 1 according to this invention.
Figure 7:
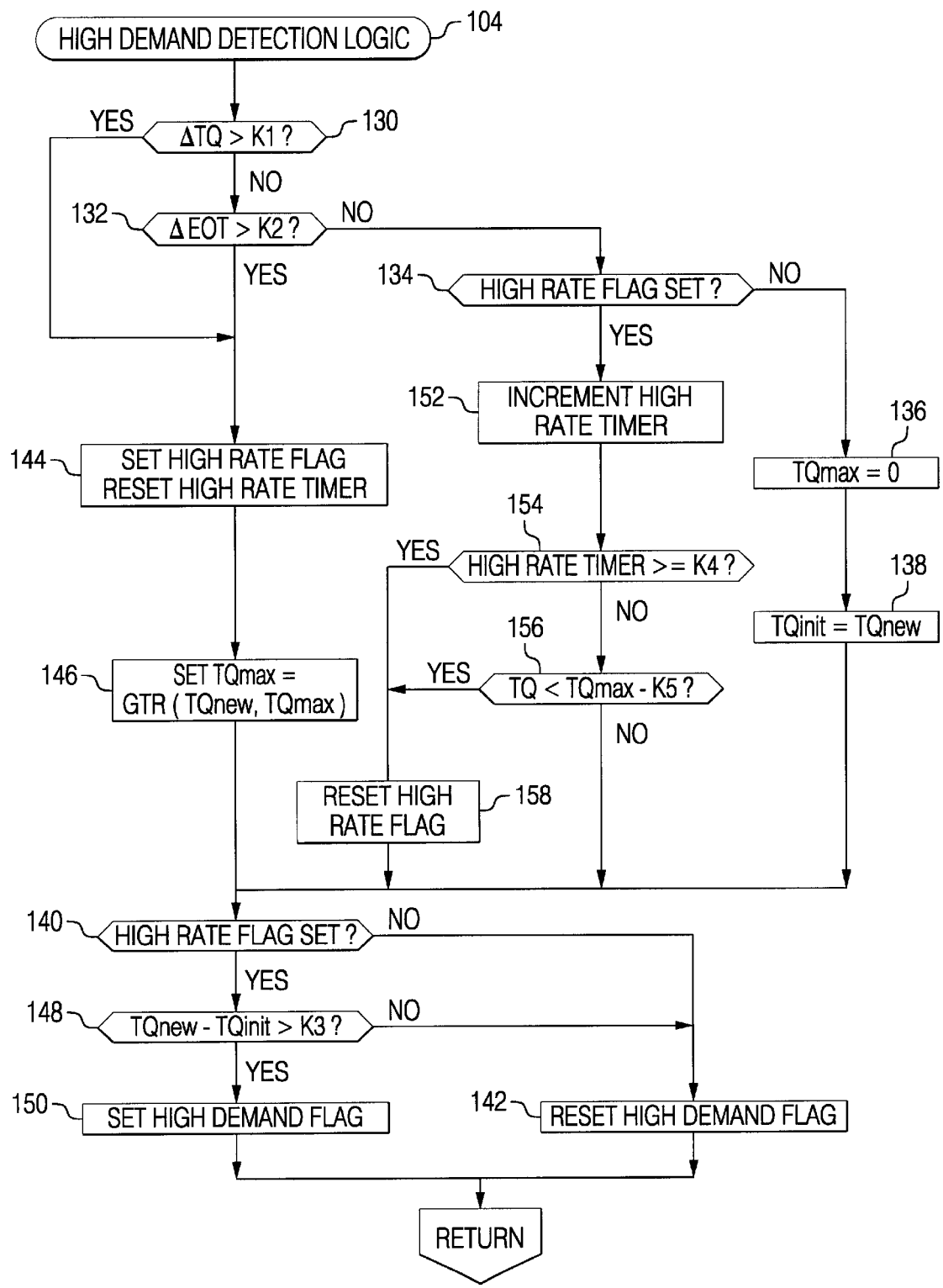
FIG. 7 is a flow diagram detailing a portion of the flow diagram of FIG. 6 pertaining to high demand detection logic.

FIGS. 6 and 7 illustrate the above-described control in flow diagram format, with the various blocks representing computer program routines and instructions executed by the control unit 66. In general, FIG. 6 depicts a main or executive flow diagram, whereas FIG. 7 details a portion of the main flow diagram pertaining to the high demand detection logic.

Referring to FIG. 6, the block 100 designates a series of instructions executed at the initiation of vehicle operation for initializing various parameters and flags to a predetermined state. Thereafter, the remaining blocks depicted in FIG. 6 are repeatedly executed as shown. Various input signals, including those described in reference to FIG. 1, are read and processed at block 102, and then block 104 is executed to detect the existence of a high demand condition, based principally on driver demand. As explained below in detail in reference to FIG. 7, block 104 controls the status of a HIGH DEMAND flag, with the flag being set during a detected period of high demand, and cleared otherwise. Block 106 schedules a desired speed ratio based on a number of factors such as manual valve position, vehicle speed, and driver demand indication TQ, and block 108 then determines if a shift is required, based on a comparison of the current and desired speed ratios. If the current ratio is not equal to the desired ratio, a shift is required, and the block 110 is executed to determine the shift type. For purposes of describing the present invention, the block 110 must only distinguish power-on downshifts from other shift types. The blocks 116–124 designate a routine carried out for power-on downshifts, whereas the block 126 designates clutch control routines for other shift types. When the shift is a power-on downshift, the block 116 first determines if the shift is already in progress. If not, the blocks 118, 120, 122 are executed to initialize the shift parameters for either normal or high demand conditions prior to executing the on-coming and off-going clutch controls of block 124; if so, the initialization blocks 118, 120, 122 are skipped as shown. The block 118 checks the status of the HIGH DEMAND flag. If the flag is not set, the block 120 initializes the shift parameters for normal, high quality, shifting. If the flag is set, the block 122 initializes the parameters for high demand shifting. As indicated above, the principle difference between normal and high demand shifting concerns the desired input trajectory (specifically, the desired acceleration TIS_DOT (des)) utilized by the off-going clutch pressure control of FIG. 4. However, other parameters may also be adjusted for high demand shifting in order to initiate and complete the shift more promptly; for example, the synchronization time Tsync, and the reference time Tofg_slip(des) may be shortened. Finally, the block 128 is executed, symbolizing other controls such as diagnostic routines, and so on.

Referring to the high demand detection logic of FIG. 7, the blocks 130 and 132 are initially executed to compare the rate of change of driver demand ($\Delta$TQ) and rate of change of engine output torque ($\Delta$EOT) to respective threshold values K1 and K2. In ordinary driving, neither of the thresholds K1, K2 are exceeded; in such case, the blocks 130, 132, 134 are all answered in the negative, and blocks 136, 138 are executed to set TQmax equal to zero, and to set TQinit equal to the current driver demand value TQnew. As explained below, TQmax is a variable that follows the peak driver demand during a detected period of high demand, and TQinit is a variable that stores the driver demand value when a high throttle or engine torque rate is detected at blocks 130 or 132. The HIGH RATE flag, tested at blocks 134 and 140, is initialized to zero by block 100 of FIG. 6. Thus, during ordinary driving conditions, the block 140 is answered in the negative, and block 142 clears the HIGH DEMAND flag.

When the driving conditions change and either (or both) conditions defined by blocks 130, 132 are met, blocks 144 and 146 are executed to set the HIGH RATE flag, to reset a HIGH RATE TIMER, and to set TQmax equal to the greater of the current driver demand TQnew and the prior value of TQmax. Thereafter, block 140 will be answered in the affirmative, and block 148 is executed to determine if the current driver demand TQnew exceeds the initial value TQinit by at least a calibrated amount K3, which may be 10% for example. If block 148 is answered in the affirmative, the block 150 sets the HIGH DEMAND flag; otherwise, the block 142 resets the HIGH DEMAND flag as mentioned above. Thus, the HIGH DEMAND flag is set so long as the conditions of blocks 130 and/or 132 are met (i.e., HIGH RATE flag set), and the driver demand continues to exceed the initial value TQinit by at least K3. When the high rate conditions (blocks 130 and/or 132) are no longer met, the block 152 increments the HIGH RATE flag. If the timer value reaches a calibrated value K4 (as determined at block 154) or the driver demand value TQnew falls below TQmax–K5, (as determined at block 156), the block 158 is executed to reset the HIGH RATE flag, which results in clearing of the HIGH DEMAND flag, as indicated by blocks 140, 142. Thus, once the HIGH RATE flag is set, it continues to be set until the high rate conditions (blocks 130 and/or 132) are not met for a calibrated interval (K4), or the driver demand falls off.

Figure 9:
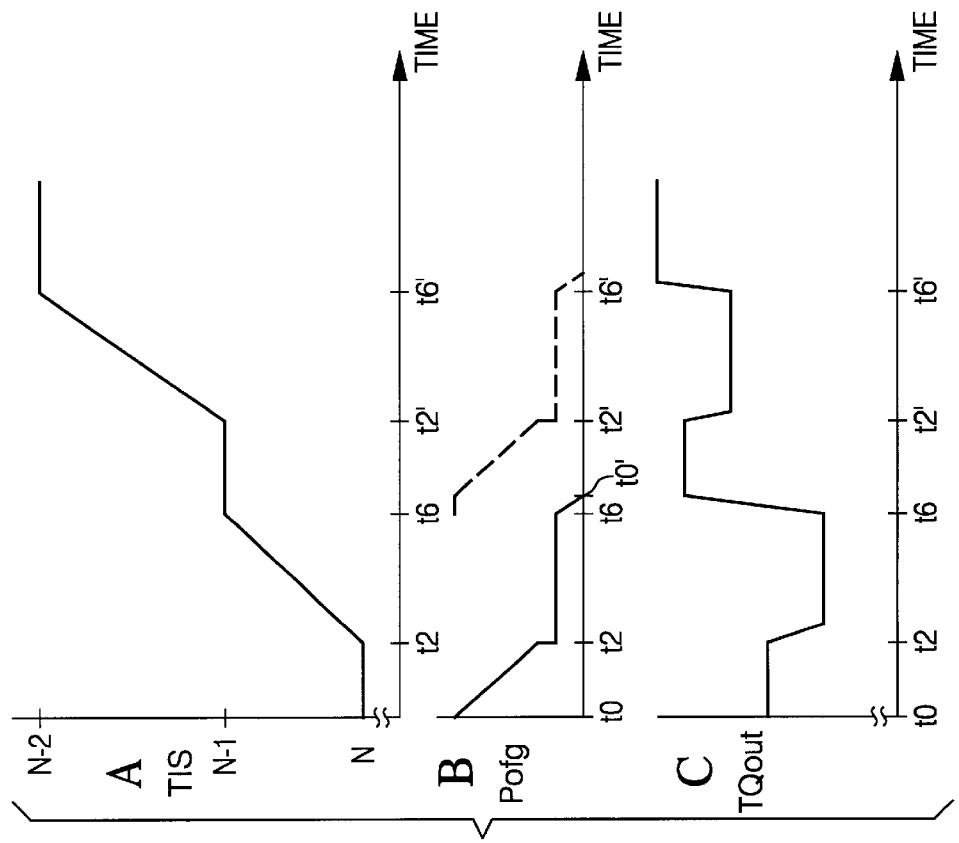
FIG. 9, Graphs A–C, graphically depict successive downshifts carried out under high demand conditions.
Figure 8:
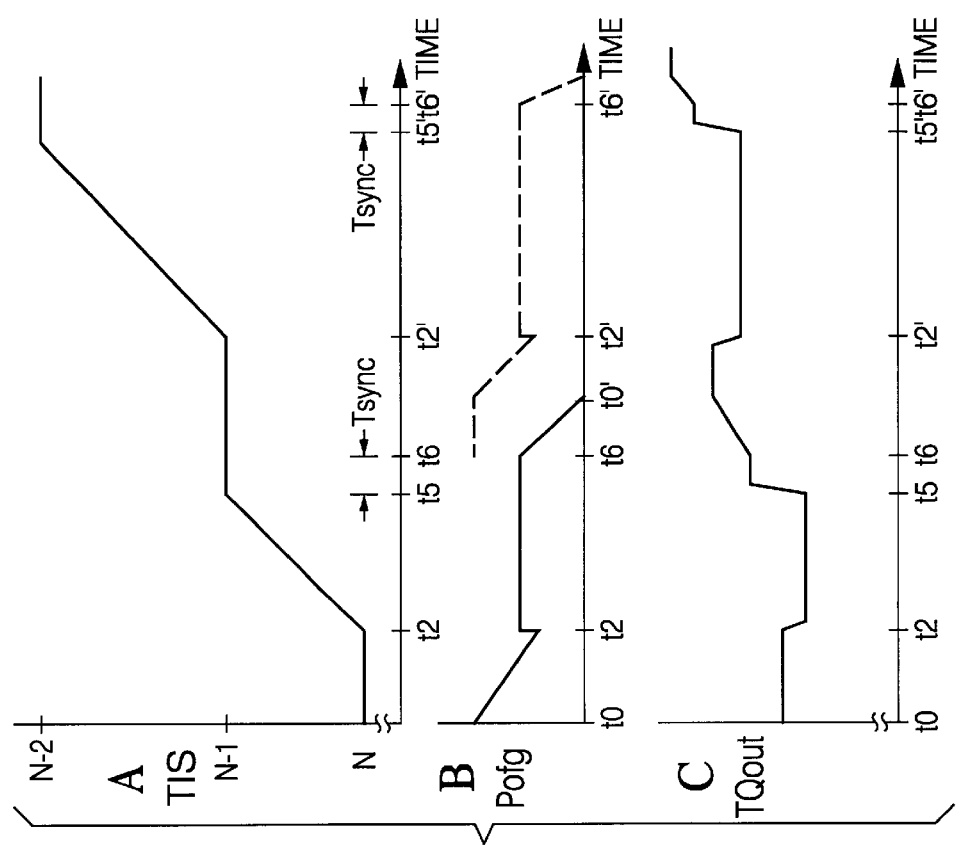
FIG. 8, Graphs A–C, graphically depict successive downshifts carried out under normal demand conditions.

FIGS. 8 and 9 graphically depict two successive power-on downshifts carried out under normal and high demand conditions, respectively. The initial speed ratio is identified as N, so that the first downshift is from N to N–1, and the second downshift is from N–1 to N–2. In each case, Graph A depicts the input speed TIS, Graph B depicts the off-going clutch pressure Pofg (for each shift), and Graph C depicts the transmission output torque TQout. In Graphs B, the off-going pressure for the first downshift is shown as a solid trace, while the off-going pressure for the second downshift is shown as a broken trace.

The normal condition shifts depicted in FIG. 8 are carried out as described above in reference to FIG. 4, and are calibrated to optimize shift smoothness, as manifested by the relatively small drop in output torque TQout in the interval t2–t5. Also, the synchronization hold interval t5–t6 and the gradual reduction of Pofg in the interval t6–t0– produces an extended, stepped, output torque rise in the interval t5–t0'. Moreover, the shift initiation and shift completion phases are carried out so as to ensure consistent high quality shifting. For example, at shift initiation, the off-going pressure is reduced at a rate (determined by reference time Tofg_slip (des)) that enables the control unit 66 to reliably identify the pressure corresponding to initial off-going clutch slippage.

The high demand condition shifts depicted in FIG. 9 are calibrated to optimize responsiveness to driver demand. Compared to the shifts of FIG. 8, the shifts of FIG. 9 produce a sharper rise in input speed, and are both initiated and completed more promptly. The sharper rise in input speed is due to the scheduling of an elevated input acceleration trajectory TIS_DOT(des), as explained in reference to the flow diagram of FIG. 6, and the prompt initiation and completion are due to the shorter reference time Tofg_slip (des) and the reduction of the synchronization hold interval Tsync. These differences produce a sharper drop and subsequent rise in output torque, as seen in Graph C, but the shifts are perceived as being more responsive to driver demand, and the shift interval t0–t0' is significantly reduced.

In summary, the control of this invention is responsive to driver demand to provide smooth, high quality, power-on downshifting during ordinary driving conditions, and more responsive power-on downshifting during high demand conditions. While described in reference to the illustrated embodiment, it will be understood that various modifications in addition to those mentioned above will occur to those skilled in the art. Thus, it will be understood that controls incorporating these and other modifications may fall within the scope of this invention, which is defined by the appended claims.

What is claimed is:

1. A method of controlling on-coming and off-going pressures supplied to on-coming and off-going clutches in a vehicle automatic transmission to downshift the transmission from a current speed ratio to a target speed ratio in response to a driver demand indication, the transmission having an input shaft coupled to receive engine output torque, the method comprising the steps of:

monitoring a rate of change of the driver demand indication, and when the monitored rate of change exceeds a reference rate of change, indicating a high rate condition and storing the driver demand indication;

setting and clearing a high demand indication based on said high rate indication and comparison of said driver demand indication to said stored indication;

determining a downshift acceleration trajectory in dependence on said high demand indication, the downshift acceleration trajectory being set to a first calibrated value for achieving a smooth downshift when said high demand indication is cleared, and to a second calibrated value for achieving a quick and firm downshift when said high demand indication is set; and when a downshift is desired, controllably releasing the off-going clutch to allow the engine output torque to increase a speed of the input shaft toward a synchronous speed of the target speed ratio in accordance with the determined acceleration trajectory.

2. The method of claim 1, including the steps of:

determining a shift initiation interval in dependence on said high demand indication, the shift initiation interval being set to a first calibrated value for achieving smooth downshift initiation when said high demand indication is cleared, and to a second calibrated value for achieving fast downshift initiation when said high demand indication is set; and when the downshift is desired, progressively reducing the off-going pressure so that the off-going clutch begins to slip at an end of the determined shift initiation interval.

3. The method of claim 1, including the steps of:

determining a synchronization hold interval in dependence on said high demand indication, the synchronization hold interval being set to a first calibrated value for achieving smooth downshift completion when said high demand indication is cleared, and to a second calibrated value for achieving fast downshift completion when said high demand indication is set; and controlling the on-coming and off-going pressures to maintain the input shaft speed at said synchronous speed for said determined synchronization hold interval, and then raising the on-coming pressure and releasing the off-going pressure to complete the downshift.

4. The method of claim 1, including the step of:

monitoring a rate of change of the engine output torque, and when the monitored rate of change exceeds a reference change, indicating said high rate condition and storing the driver demand indication.

5. The method of claim 1, including the step of:

setting the high demand indication when the high rate condition is indicated and the driver demand indication exceeds the stored indication by at least a reference amount.

6. The method of claim 1, including the step of:

clearing the high demand indication when the driver demand indication falls below the stored indication by at least a reference amount.

7. The method of claim 1, including the steps of:

determining a peak driver demand indication occurring while said monitored rate of change exceeds said reference rate of change; and after said monitored rate of change no longer exceeds said reference rate of change, clearing said high demand indication if the driver demand indication falls below the determined peak indication by at least a reference amount.

8. The method of claim 7, including the steps of:

initiating a timed interval when said monitored rate of change no longer exceeds said reference rate of change; and clearing said high demand indication when said timed interval reaches a reference time.

* * * * *